United States Patent [19]

Weston

[11] 4,039,999
[45] Aug. 2, 1977

[54] COMMUNICATION SYSTEM

[76] Inventor: John Weston, 100 Elizabeth Ave., Apartment 307, St. John's, Newfoundland, Canada, A1B 1S1

[21] Appl. No.: 658,629

[22] Filed: Feb. 17, 1976

[51] Int. Cl.² .......................................... H04B 11/00
[52] U.S. Cl. .................................. 340/5 T; 325/16; 325/22; 325/28; 325/45
[58] Field of Search .................... 325/16, 28, 145, 45; 340/5 T

[56] References Cited

U.S. PATENT DOCUMENTS

| 2,576,157 | 11/1951 | Tykulsky | 325/45 |
|---|---|---|---|
| 3,218,607 | 11/1965 | Brock et al. | 340/5 T |
| 3,334,300 | 8/1967 | Pischke et al. | 325/45 |
| 3,345,568 | 10/1967 | Errichiello et al. | 325/16 |
| 3,427,579 | 2/1969 | Sebesta | 340/5 T |
| 3,470,473 | 9/1969 | Gilman et al. | 325/45 |

OTHER PUBLICATIONS

Gazey et al., *Electronic Engineering*, vol. 36, No. 436, June 1964, pp. 364–368.

Primary Examiner—Richard A. Farley

[57] ABSTRACT

Amplitude modulation systems for underwater communication have a number of disadvantages. For example, with a number of divers attempting to communicate simultaneously, intolerable cross-talk occurs. Variable tuning is necessary to overcome this problem. However, the invention disclosed herein uses angle modulation (phase or frequency modulation) which inherently has fewer noise problems and, because of the "capture effect" reduces any cross-talk problems. In an exemplary embodiment an audio transducer feeds a modulator to produce frequency modulated radio frequency signals which are fed to a balanced modulator together with a fixed frequency radio frequency signal from a local oscillator. The output of the balanced modulator comprises ultrasonic frequency signals which are frequency modulated in accordance with the audio signals. Also disclosed is a receiver for such ultrasonic frequency signals. By the use of integrated circuits, a combined ultrasonic transmitter and receiver may be provided in a compact unit adapted to be strapped on the head of a diver.

3 Claims, 18 Drawing Figures

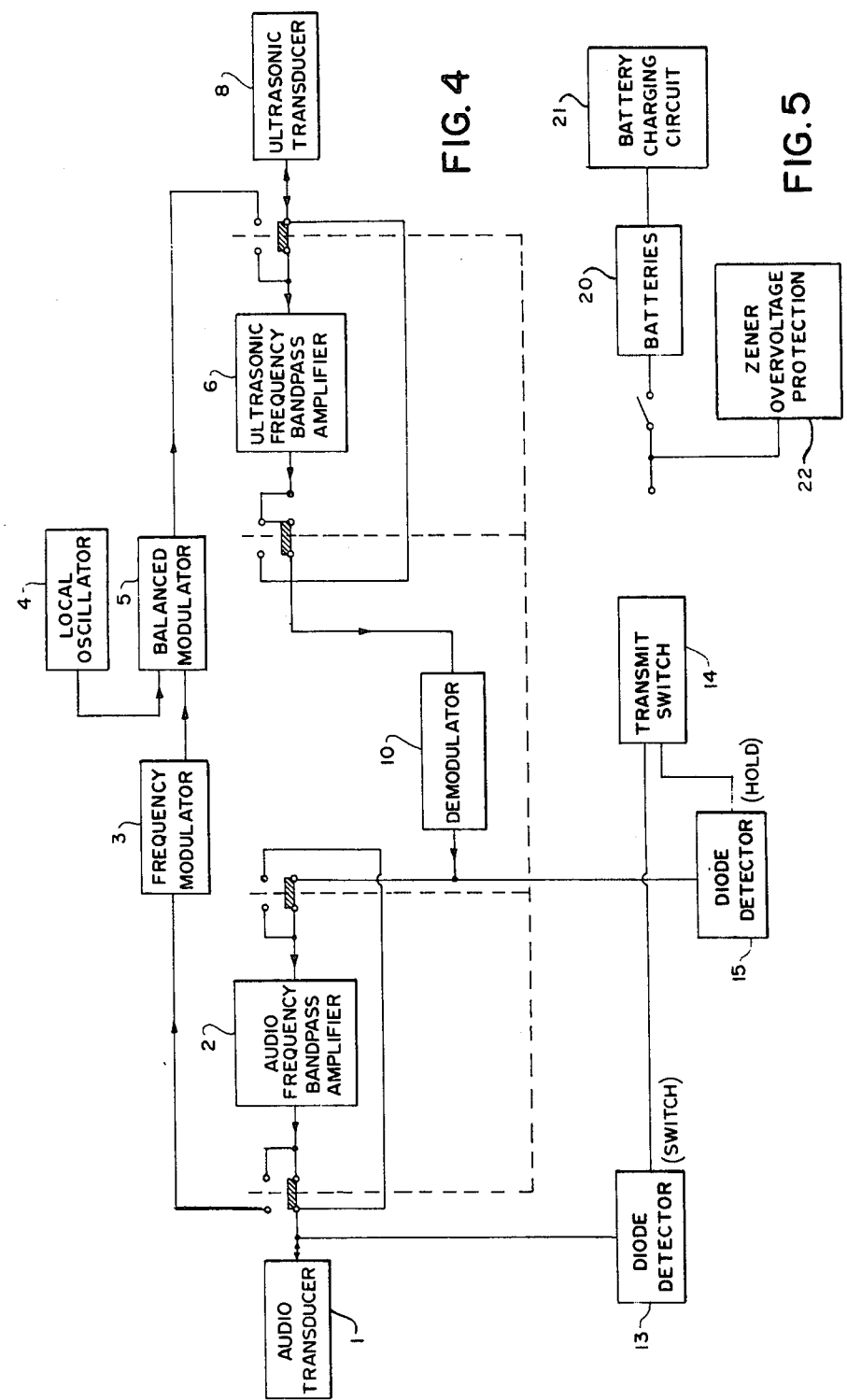

WEIN BRIDGE OSCILLATOR

COMMUNICATION SYSTEM

BACKGROUND OF THE INVENTION

This invention relates to an ultrasonic transmitter and receiver, particularly to ultrasonic transmitters and receivers adapted for use in underwater voice communication.

The high ambient noise rejection capabilities of phase or frequency modulation systems, hereinafter generically referred to as angle modulation systems, give the system to be described advantages over existing amplitude modulation systems now employed in the field of underwater communications. Primarily, to produce a signal at the output stage of the receiver of equivalent signal-to-noise ratio to a comparable amplitude modulation system requires either less transmitted power at the same range or allows for increased range at the same transmitted power. This is an inherent property of angle modulation systems and results from the fact that the carrier amplitude is maintained substantially constant.

A further advantage arises due to the "capture effect" associated with wide band angle modulation systems. With a number of divers attempting to communicate simultaneously with identical units according to the invention, a situation which would result in intolerable cross-talk in amplitude modulation systems, any one diver will essentially hear only the diver nearest to him with little or no interference from the others. A relatively distant diver, or base station, however, may transmit and be received by any number of divers when the other transmitters are not in use. In this way, selective communication is facilitated, i.e. a large number of divers may communicate amongst themselves in pairs or in groups, and to and from surface or submerged vessels, at the same carrier center frequency. This feature largely eliminates the need for variable tuning.

SUMMARY OF THE INVENTION

According to one aspect of the present invention, there is provided an ultrasonic transmitter comprising an audio transducer for converting audio signals into audio frequency electrical signals. These electrical signals are fed to an input of a first modulator which produces at its output angle modulated radio frequency signals of predetermined center frequency. These radio frequency signals are fed to one input of a balanced modulator having a second input to which is fed a fixed frequency radio frequency signal from a local oscillator. The center frequency of the first modulator and the fixed frequency of the local oscillator differ in frequency by an amount such that the balanced modulator produces at its output ultrasonic frequency signals which are angle modulated in accordance with the audio signals. The ultrasonic frequency signals are then fed to an ultrasonic transmitting transducer.

Preferably the audio frequency electrical signals are fed to the input of the frequency modulator via an audio frequency band-pass amplifier. This reduces both the low frequency noise content of the signal and the overall band width required of the system.

According to another aspect of the invention, there is provided a receiver for ultrasonic signals, angle modulated by an audio signal comprising an ultrasonic receiving transducer having an output which is fed via an ultrasonic frequency band-pass amplifier to a demodulator. The demodulator has an output which comprises audio frequency signals corresponding to the audio modulation of the received ultrasonic signals. The output of the demodulator is fed via an audio frequency band-pass power amplifier to an audio frequency transducer.

According to another aspect of the invention, an ultrasonic transmitter and receiver may be combined into a single unit. Some components find common use in the transmitter and in the receiver and switching means provide the appropriate connections during transmission and reception. The transmitter and receiver unit preferably use integrated circuit techniques wherever possible to keep the unit light and compact enough to be incorporated in a structure which may be worn on the head of a diver, as will be discussed in more detail later on. Of course, the transmitter and receiver unit has to be incorporated in a water-tight container. A resilient head-strap attached to the container allows it to be worn on the head of a diver. A bone conduction audio transducer on one side of the strap presses against the head of the diver while the ultrasonic transducer is disposed on the strap so as to transmit ultrasonic signals into the water surrounding the diver.

BRIEF DESCRIPTION OF THE DRAWING

FIG. 4 is a block diagram of a transmitter and receiver unit which may be worn by a diver, FIG. 5 is a block diagram of a circuit for charging the batteries used in the system but not shown in the previous block diagrams, it being common practice not to show power supplies in block diagram, FIGS. 6 and 7 together show details of the means enabling charging of the batteries from an external source.

DESCRIPTION OF THE PREFERRED EMBODIMENTS

Figure 1:
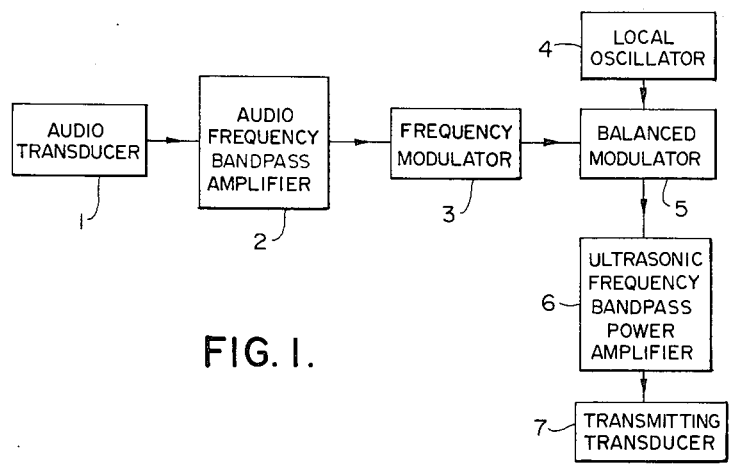
FIG. 1 is a block diagram of the transmitter circuit according to the invention.

Referring to FIG. 1, there is shown an ultrasonic transmitter according to the invention. The transmitter comprises an audio transducer 1 which converts audio signals into audio frequency electrical signals. These electrical signals are fed to an input of frequency modulator 3, preferably via an audio frequency band-pass amplifier 2. The band-pass amplifier 2 reduces low frequency noise content of the signal and the overall band width required of the system. Upper and lower 3 dB points are typically 3000 Hz and 300 Hz, respectively.

The audio transducer 1 preferably comprises a bone conduction microphone which will pick up the diver's voice but not the sound of bubbles produced when he talks or exhales. While it is difficult for a diver to talk with the mouthpiece of his breathing apparatus in his mouth he can, nevertheless, learn to do so.

The frequency modulator 3 produces at its output frequency modulated radio frequency signals of predetermined center frequency which are fed to one input of a balanced modulator 5. A second input of the balanced modulator 5 is fed by a fixed frequency radio frequency signal from a local oscillator 4. The balanced modulator produces at its output ultrasonic frequency signals which are angle modulated in accordance with the audio signals. The ultrasonic frequency signals are fed to an ultrasonic transmitting transducer 7.

The Q of the transmitting transducer 7 is preferably very low to accommodate the frequency swing required to attain a deviation ratio of at least 3.

The present invention enables angle modulation of a relatively low frequency ultrasonic range carrier to be accomplished without the use of large reactive elements. When the outputs of the frequency modulator 3 and the local oscillator 4 are supplied as inputs to the balanced modulator 5, the resulting output is comprised of two distinguishable signals, namely the sum and difference, in the frequency domain, of the two input signals. These comprise the desired angle modulated ultrasonic frequency signal and an angle modulated radio frequency signal of center frequency approximately twice that of the local oscillator 4. For example, if the frequency modulator 3 has a center frequency of 1.00 MHz and the local oscillator 4 has a fixed frequency of 0.95 MHz, angle (frequency) modulated signals at 0.05 MHz (50 KHz) and at 1.95 MHz appear at the output of the balanced modulator 5. The low pass characteristic of the power amplifier 6 effectively filters out the higher frequency signal, leaving the desired angle modulated ultrasonic frequency signal intact.

Stability of the center frequency of this signal is preferably ensured in the following manner. The active elements of the oscillators, namely the amplifiers, are contained in one integrated circuit (monolithic dual operational amplifiers) and the passive elements of the frequency determining circuits (resistors, capacitors and diodes) are densely mounted in a common heat sink. The oscillators have been found to track well over the temperature range of interest, from 0° C to 30° C (maximum underwater ambient conditions) when low temperature coefficient precision resistors and capacitors are used, the dual operational amplifiers are closely matched (in manufacture) and circuit symmetry is maintained for both oscillators, i.e. the local oscillator 4 and the oscillator in the frequency modulator 3.

Figure 2:
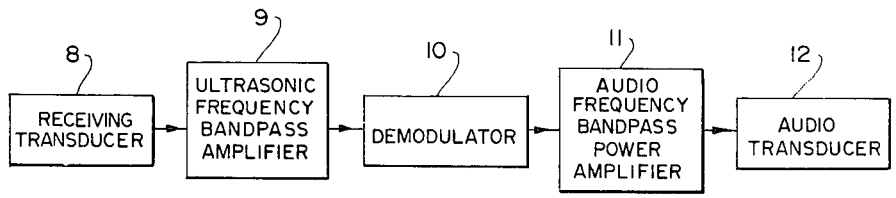
FIG. 2 is a block diagram of a receiver circuit according to the invention.

A receiver circuit according to the present invention is shown in block diagram form in FIG. 2. This receiver can detect and demodulate, without the use of LC tuned circuits, signals from a transmitter such as shown in FIG. 1. This thereby eliminates both the need for LC tuning networks and the associated instability problems.

The receiving transducer 8 converts acoustic energy transmitted through the water to corresponding electrical signals. Preferably, of course, the Q of the receiving transducer 8 is comparable to the Q of the transmitting transducer 7 of FIG. 1. The output signal from the receiving transducer 8 is amplified by the ultrasonic frequency band-pass amplifier 9 which has upper and lower 3 dB points corresponding to the transmitter band limits. In this way, the low frequency acoustic noise present in the marine environment is filtered from the input signal, as is the higher frequency radio noise, particularly for surface base stations. This amplified and filtered signal is then fed to the demodulator 10. A method of demodulation which facilitates the use of integrated circuit techniques and which produces the desired output, namely the original audio (modulating) waveform is given as follows.

The input signal is passed through a limiter, typically back-to-back Zener diodes, resulting in a waveform which is basically a varying frequency squarewave. Each time this squarewave goes positive, i.e. crosses zero in a positive going manner, it triggers a circuit which produces a constant amplitude, constant duration pulse. This circuit is typically a mono-stable multivibrator. Time integration of these pulses, for example by an audio frequency RC detector network, results in recovery of the original audio signal.

The audio signal is amplified by the audio frequency power amplifier 11. The resultant amplified electrical signal is converted to the corresponding acoustical signal by the audio transducer 12.

Figure 3:
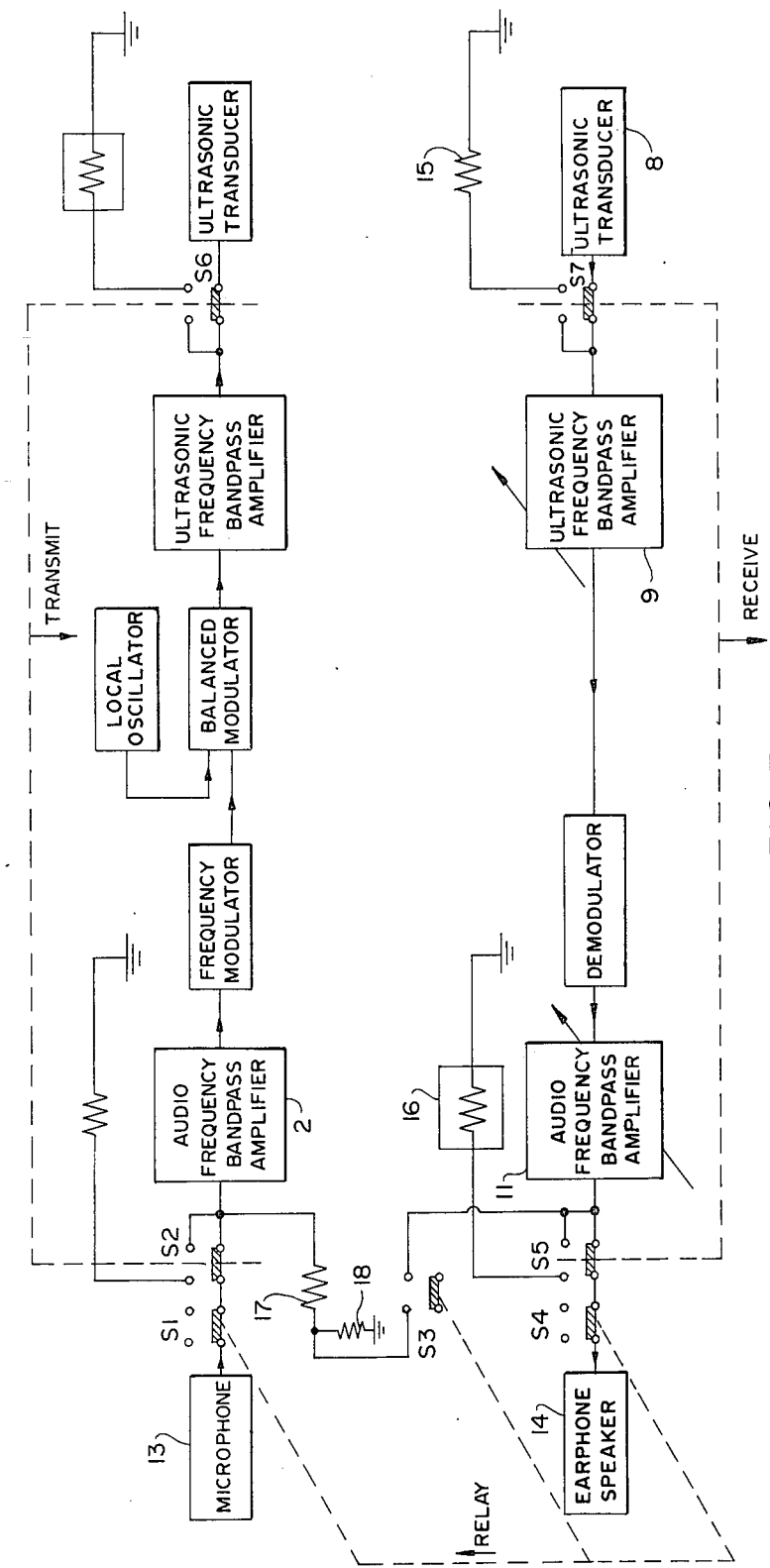
FIG. 3 is a block diagram of a base station including both transmission and reception facilities.

A suitable base system, which may be located in a surface or submarine vessel, is illustrated in block diagram form in FIG. 3. Non-overlapping transmitter and receiver circuitry are utilized as a result of the desirability of simultaneous transmit and receive capabilities in a base system. The audio transducers 1 and 12 of FIGS. 1 and 2 are here shown as replaced by a microphone 13 and earphone and/or speaker 14, respectively. Here the gain of the ultrasonic frequency band-pass amplifier 9 in the receiver portion is externally adjustable to permit varying the receiver's sensitivity. Controlled by manual switches S1–S7 are the following four modes of operation:

1. Transmit.
2. Receive.
3. Transmit/receive — simultaneous transmit and receive mode for interactive communication with a number of divers.
4. Relay — attenuated output of audio frequency power amplifier 11 fed as an input to audio band-pass amplifier 2 thereby utilizing the base station as a relay station.

With the switches in the position shown in FIG. 3, the system is in the transmit/receive mode.

The lower part of FIG. 3 corresponds essentially to FIG. 2 while the upper part of FIG. 3 corresponds essentially to FIG. 1 so that no detailed description is believed necessary.

With switches S5 and S7 in the upper position (standby), the ultrasonic transducer 8 is disconnected from the circuit and the input of the ultrasonic frequency band-pass amplifier 9 is connected to ground through a resistor 15. Simultaneously, the output of audio frequency band-pass amplifier 11 is connected to ground through a resistor 16. The circuit is adapted to receive ultrasonic signals when switches S5 and S7 are in the lower position.

The operation of switches S2 and S6 between their upper and lower positions (standby/transmit) produces results which can readily be determined by inspection of FIG. 3. Note that switches S2 and S6 are ganged, as are switches S5 and S7, as indicated by the dashed lines.

Switches S1, S3 and S4 are ganged and when moved to the upper position, the system is in mode 4, i.e. acting as a relay. Thus the output of audio frequency band-pass amplifier 11 is fed through switch S3 and a voltage divider comprising resistors 17 and 18 to the input of audio frequency band-pass amplifier 2 while microphone 13 is disconnected from the input of audio frequency band-pass amplifier 2 because switch S2 is then open. The voltage divider network of resistors 17 and 18 attenuates the output of audio frequency band-pass amplifier 11 so as not to overload audio frequency band-pass amplifier 2.

While not shown in the drawings, an on-off power switch is preferably externally mounted as is the audio frequency power amplifier 11 gain control. Normal marine instrumentation packaging techniques are employed to seal the electronics from moisture, in addition to the protection provided by silicone or epoxy encapsulation of all circuitry.

FIG. 4 shows, in block diagram form, a transmitter and receiver unit for use by a diver. As simultaneous transmission and reception by one party are not required, functions which are duplicated in transmission and reception are carried out by the same block of circuitry or the same transducer. The two audio frequency band-pass amplifiers 2 and 11 and the two ultrasonic frequency band-pass amplifiers 6 and 9 of FIGS. 1 and 2 have been combined into one audio frequency band-pass amplifier 2 and one ultrasonic frequency band-pass amplifier 6. The transmitting transducer 7 and receiving transducer 8 of FIGS. 1 and 2 may (but need not) be combined into the single ultrasonic transducer 8 shown in FIG. 4 where short range communications only are required. The audio transducers 1 and 12 of FIGS. 1 and 2 are combined in this Figure and shown as the audio transducer 1. This is accomplished through the use of bone conduction transponder techniques.

The necessary switching arrangements are also shown in FIG. 4. The transmit switch 14 which is normally open, i.e, in the "receive" mode, operates only when the diode detector 13 detects an audio signal from the audio transducer 1 and the diode detector 15 detects an absence of an audio signal at the output of the demodulator 10.

From the discussion of the preceding figures, it is believed that the operation of FIG. 4 will be readily apparent. With the switches in the positions shown in FIG. 4, the unit is obviously adapted to receive signals picked up by ultrasonic transducer 8 and to produce an audio output from audio transducer 1. With the switches, which are ganged, changed to the alternate (upper) position, the unit can transmit provided that transmit switch 14 is enabled as mentioned previously.

Referring to FIG. 5, the power supply preferably consists of small, high energy density storage batteries 20, a battery charging circuit 21 and a Zener diode over-voltage protection circuit 22. The latter circuit comes into use only when operation from an outside power supply, through the battery charging circuit, is required, and is therefore wired in series with the on-off switch and in parallel with the batteries.

Figure 9:
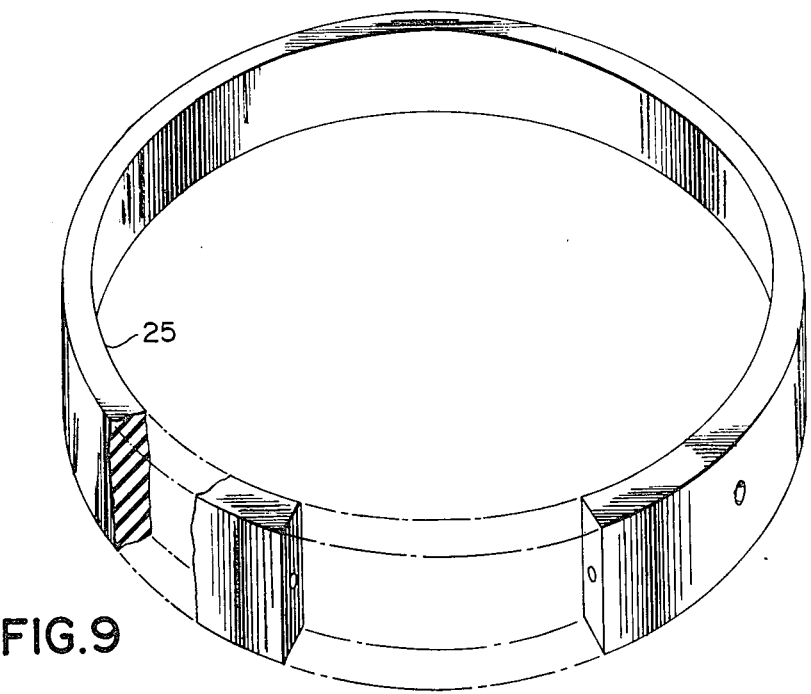
FIGS. 9, 10 and 11 illustrate the external appearance of a unit according to the invention as intended to be worn by a diver.

The preferred physical structure of the device is illustrated in FIG. 9 and it exhibits the following advantages over current devices of similar purpose:

1. High inherent structural strength due to low volumetric displacement and full internal silicone or epoxy encapsulation of electronic circuits.
2. No external metallic or conductive connectors, resulting in increased reliability.
3. No manual controls (voice-operated transmit switch, internal on-off switch, automatic gain control) resulting in increased reliability, ease of operation, and fewer seals.
4. No exposed cables (no "microphone").
5. No interference or dependence upon other items of SCUBA equipment.
6. No earphone or earpiece (or pressurization problems).
7. Low hydrodynamic drag.
8. Very little inconvenience to the user in donning, wearing, or removing the device.

Figure 10:
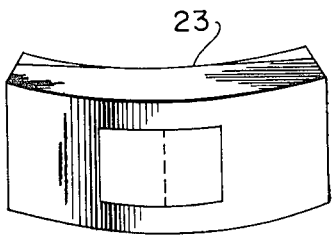
Figure 11:
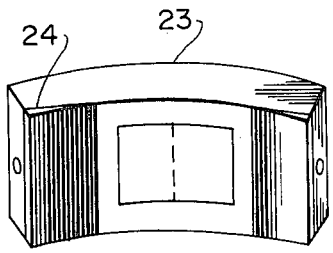

The system preferably utilizes bone conduction audio transducers which, in the context of this type of system, exhibit a number of advantages over conventional microphone-earphone arrangements. In particular, both transducers (or, when redundant, a single transducer) can be located in the same position on the head, precluding the need for a shielded microphone cable and special microphone mounting arrangements which normally involve the SCUBA regulator mouthpiece. In fact, a piezoelectric ceramic slab (or "stack" of slabs) may be bonded into a recess in the metallic housing 23 of the unit in such a way that the transducer forms an integral part of the housing, as shown in FIGS. 10 and 11. Alternatively, inertial transducers may be utilized. Rubber pads 24 around the transducers (FIG. 11) have the primary function of seating the device in such a way that maximal transducer contact is made with the head. They also provide comfort, a means of maintaining the position of the device on the head and acoustic insulation, in the transmit mode, from environmental noise.

The headband arrangement has, as its primary means of attachment to the head, a pair of resilient straps, or, as shown in FIG. 9, a single resilient strap 25 in which the following are contained:

1. The batteries, which are the power source for the device
2. The on-off switch.
3. The battery recharging socket molding and associated battery recharging circuitry, the former of which will be discussed in connection with FIGS. 6 and 7. Locating the batteries in the strap means that battery replacement does not entail breaking the hermetic seal on the main electronics and transducer housing.

Figure 8:
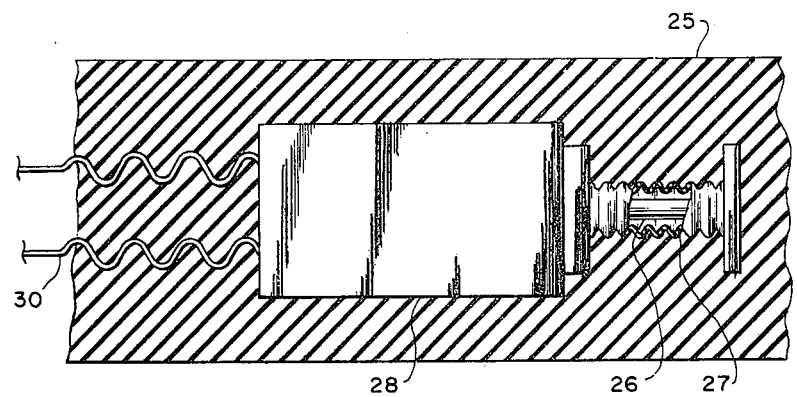
FIG. 8 shows a preferred type of on-off switch which may be used in units according to the present invention.

The on-off switch is mounted in the strap as shown in FIG. 8 and is of standard pull-on, push-off type. The resilient strap 25, made of elastomeric material, e.g. rubber, is stretched in this area when the unit is put in position on the head of a user, such as a diver. A plunger 26 within a flexible hollow tube 27 is pulled in the opposite direction from the body 28 of the switch, causing the switch to change over to the "on" position. The flexible, hollow tube 26 surrounding the shaft of the plunger makes this action somewhat more positive. The electrical connections 30 from the switch lead, of course, to the transmitter/receiver unit.

While FIG. 9 shows the ends of strap 25 butted against the ends of housing 23, the housing 23 may actually be encased in the rubber strap by molding it in with only the transducers exposed.

Figure 6:
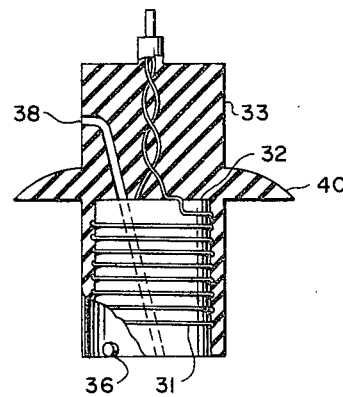
Figure 7:
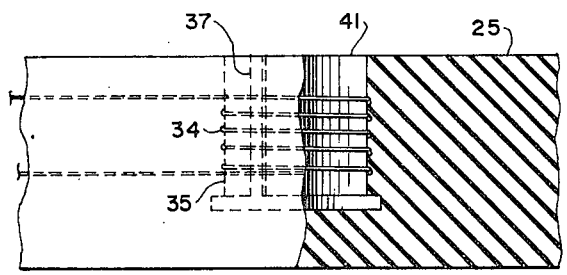

External metallic or conductive contacts are eliminated from the battery recharging circuit through the use of a magnetic coupling arrangement as shown in FIGS. 6 and 7. The primary turns 31 of this coupling arrangement are wound on a ferromagnetic core 32 and encased in a rigid non-metallic shell 33; the secondary turns 34 are wound on a hollow rigid cylinder 35 which is bonded directly to (or is a part of) the rubber strap 25 in which it is mounted. Locking facilities for the primary winding structure are provided by means of a lug or knob 36 on the primary structure and a keyway 37 in the secondary. The small passageway 38 in the primary winding structure permits any water trapped in the socket to escape and thereby facilitate proper seating. In this way, AC electrical energy can be transferred from the primary to the secondary windings and thence to the battery charging circuitry, using no metallic contacts and therefore with no electrical shock hazard, even when recharging under water. The flexible flange 40 on the primary winding structure seals the opening 41 of the hollowing cylinder 35 when the primary winding structure is inserted into the cylinder.

FIGS. 12 to 18 are actual circuit diagrams of the components shown in FIGS. 1 - 4. The portions of these circuits shown in dashed lines are commercially available integrated circuits and it is not proposed to discuss them in detail as the ratings, characteristics, etc. are available from the manufacturers. However, they will be briefly described along with the interconnections.

Figure 12:
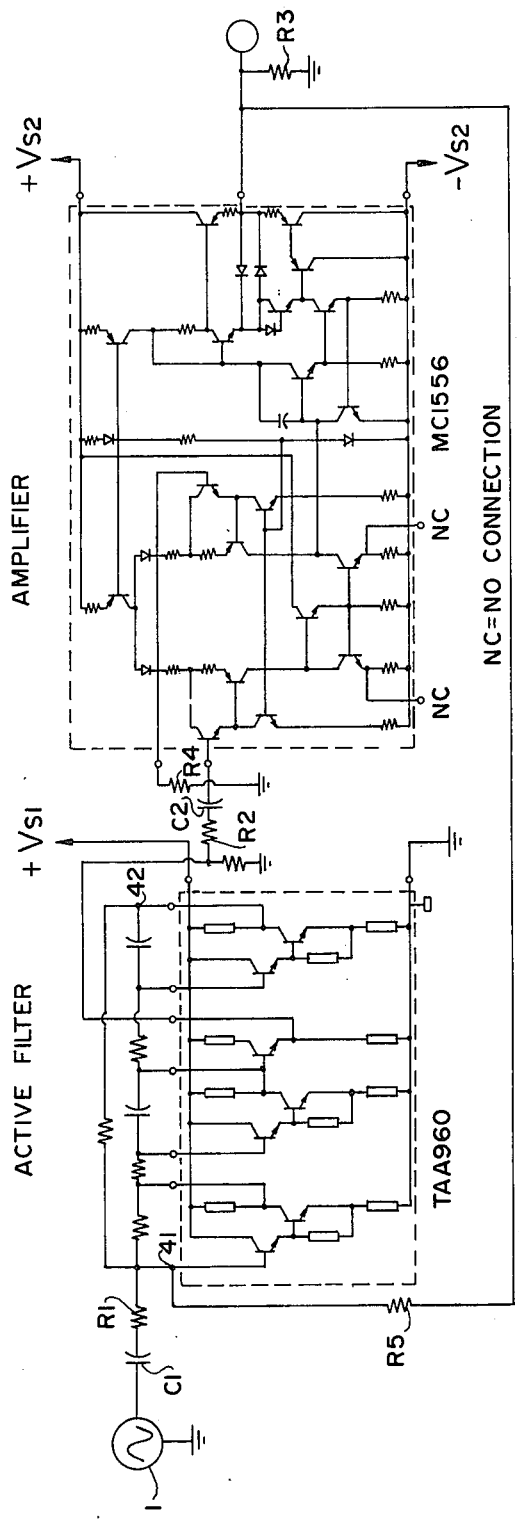
FIGS. 12–18 are detailed schematics of the circuits shown by block diagrams in FIGS. 1 – 4.

FIG. 12 shows the audio transducer 1 of, for example, FIG. 1, which is RC coupled via capacitor C1 and resistor R1 to the input of an active filter. This active filter is available as an integrated circuit from Philips Electron Devices, a division of Philips Electronics Industries Ltd., under their product designation TAA 960. This circuit consists of three identical general-purpose amplifiers integrated in a single silicon chip and is stated by Philips to be very suitable for use in an active RC band-pass filter which is what it is used for here. The upper and lower limits of the band-pass are determined by the external capacitors and resistors connected between junctions 41 and 42. The filter can be designed to have upper and lower 3 dB points of 3000 Hz and 300 Hz, respectively, which allows for adequate voice communication while cutting out any noise of high or low frequency which might exist.

The output of the active filter is RC coupled by R2 and C2 to the input of an amplifier MC 1556 which corresponds to the amplifier 2 of FIG. 1. This again is an integrated circuit and is an epitaxial passivated operational amplifier available from Motorola Semiconductor Products Inc. together with their data sheets DS 9147 R1, April 1970. The output of this amplifier is provided with a load matching resistor R3, a feedback resistor R4, and a feedback resistor R5 to the input of the active filter.

Figure 13:
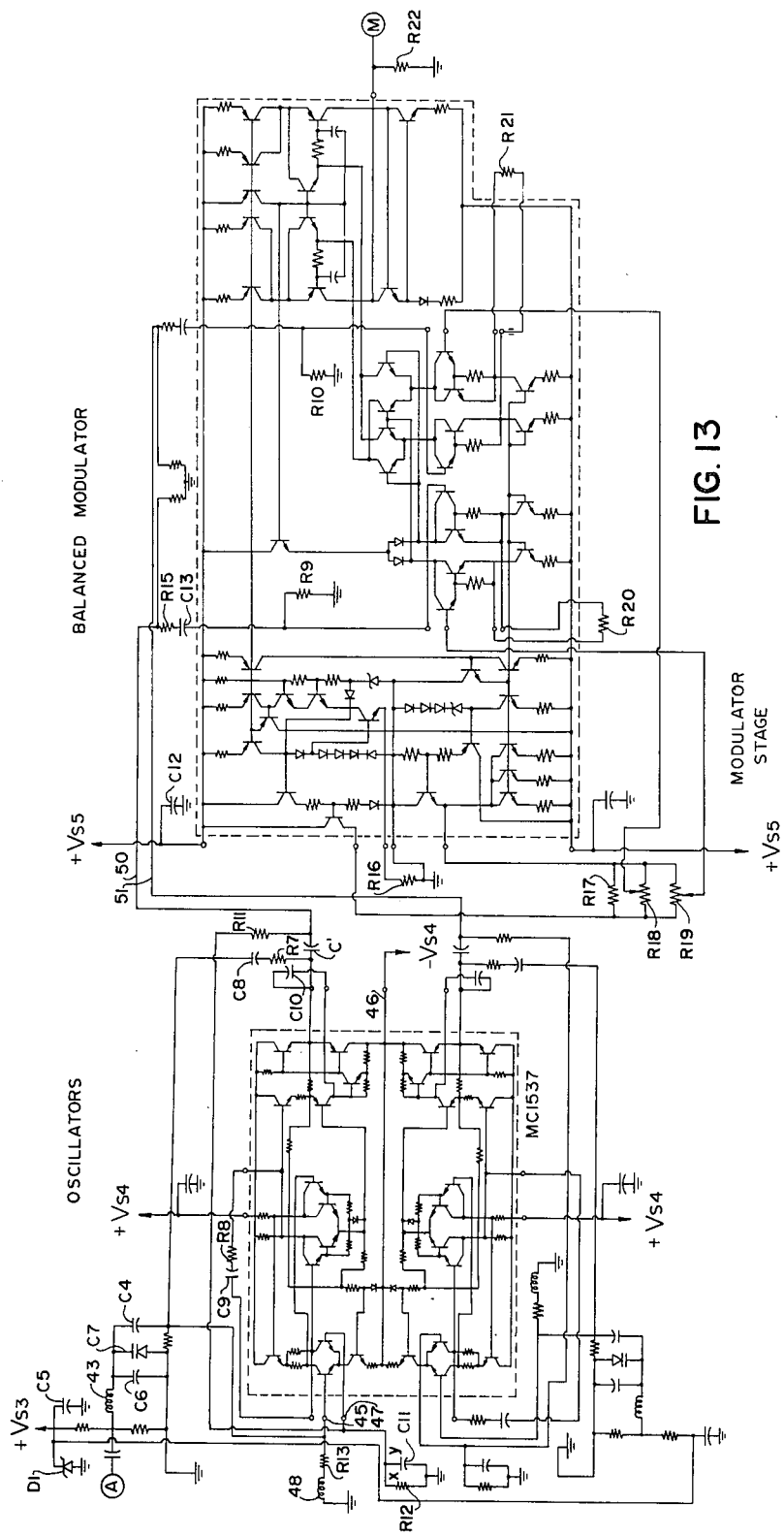
Figure 14:
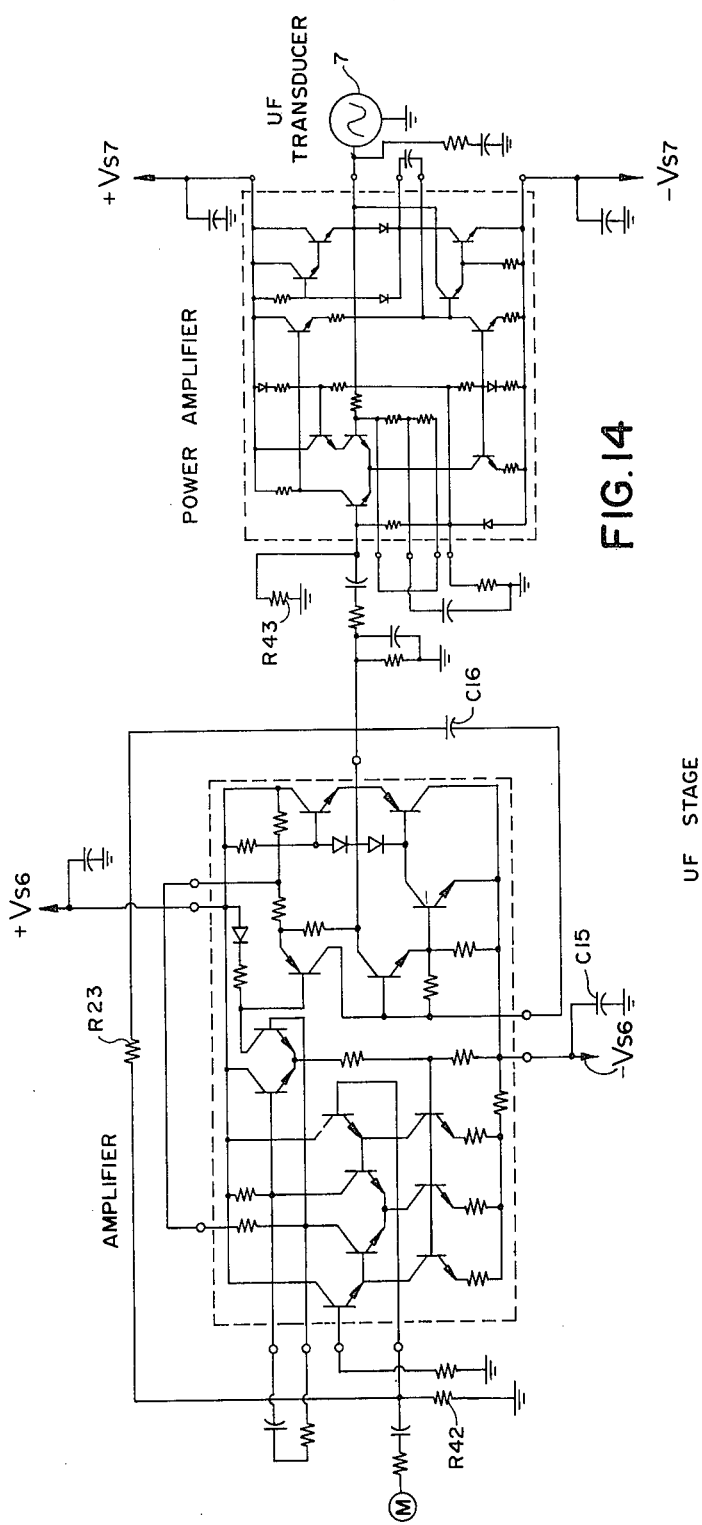

FIG. 13 shows a frequency modulator, local oscillator and balanced modulator, for example the frequency modulator 3, local oscillator 4 and balanced modulator 5 of FIG. 1.

The frequency modulator and local oscillator utilize dual operational amplifiers on a single chip so that they are both subject to the same temperature and hence "track" together in frequency with variations in temperature. These dual operational amplifiers comprise the integrated circuit MC 1537 available from Motorola Semiconductor Products Inc. with their data sheets DS 9113 R1, October 1970. Again, as the data sheets contain detailed information about this integrated circuit, it is not proposed to discuss it in detail.

The input A comprises the output of the audio stage of FIG. 12 and is fed through a coupling capacitor C3, a radio frequency choke 43 and a further coupling capacitor C4 to the non-inverting input 45 of the upper operational amplifier. In referring to "upper" and "lower" operational amplifiers, the symmetry about line 46 will be obvious.

The input signal from A causes variations in the capacitance of voltage variable capacitor C7, which is in parallel with a trimmer capacitor C6, and hence variations in frequency of the upper oscillator. The RF choke 43 prevents radio frequencies from being fed back to the audio stage, FIG. 12. The coupling capacitor C4 blocks DC from being fed to the input 45.

The upper and lower oscillators, formed from the upper and lower operational amplifiers, are energized by $+V_{S4}$ and $-V_{S4}$.

Capacitor C5 is a power supply by-pass capacitor and the Zener diode D1 is provided as a reference for frequency stability purposes.

Capacitor C8 and resistor R7 comprise a feedback circuit, which feeds back to input 45. Capacitor C9 and resistor R8 provide input lag compensation while capacitor C10 provides output lag compensation.

Resistor R11 in series with the parallel combination of resistor R12 and capacitor C11 form a feedback connection to the inverting input 47 of the upper operational amplifier.

The frequency of the upper oscillator is primarily determined by the feedback connections but may be modulated by input signals on terminal A from the audio stage. The lower oscillator is the same as the upper one but has no audio input and simply comprises the local oscillator. Resistor R13 and the Rf choke 48 provide an audio "sink" to prevent modulation of the upper oscillator.

Figure 15:
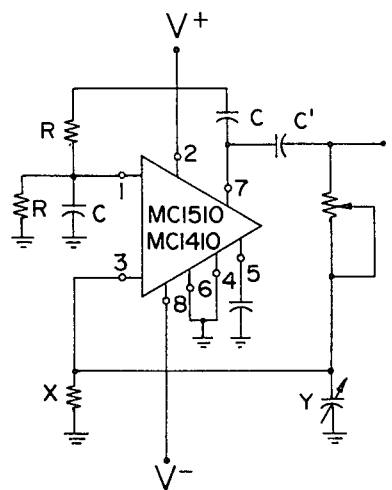

The oscillators are actually Wein bridge oscillators similar to that shown in FIG. 12 of data sheets DS 9078 R2, February 1970, of Motorola Semiconductor Products Inc. and here reproduced as FIG. 15. This again is an integrated circuit using wideband amplifiers MC 1510 or MC 1410. However, in FIG. 13, the upper oscillator uses a voltage variable capacitor C7 in place of the capacitor C connected to input 1 of FIG. 15 to allow the frequency of this oscillator to be varied in accordance with the audio input.

Capacitor C' of FIG. 15 is indicated in FIG. 13 for the upper oscillator, as are feedback connections X and Y.

The outputs of the frequency modulator and the local oscillator provide two inputs 50 and 51 for the balanced modulator which is formed from an integrated circuit designated MC 1594 and is available from Motorola Semiconductor Products Inc. See their data sheets DS 9163 dated October 1970.

The balanced modulator multiplies two signals together to give sum and difference frequencies but only the difference frequencies are used as these are in the ultrasonic range and the transducer will not respond to the sum frequencies anyway.

Capacitor C12 is a power supply by-pass capacitor. Resistor R15 and capacitor C13 provide input coupling for input 50.

Resistor R16 is a biasing resistor, resistor R17 is a trimmer resistor, resistor R18, which is a variable resistor, provides input offset adjustment and resistor R19, another variable resistor, provides output offset voltage adjustment, i.e, zero adjustment.

Resistor R20 provides a zero adjustment for one input and resistor R21 provides zero adjustment for the other input. Resistor R22 is a loading matching resistor. R9 and R10 are input impedance matching resistors.

The output M of the balanced modulator of FIG. 13 feeds the input M of an ultrasonic frequency amplifier stage (FIG. 14) such as the ultrasonic frequency band-pass power amplifier 6 of FIG. 1. Two integrated circuit amplifiers are used here, an MC 1533 feeding an MC 1554. The MC 1533 is an operational amplifier monolithic silicon integrated circuit available from Motorola Semiconductor Products Inc. and described in their data sheets DS 9060, R2 dated November 1970. Capacitor C15 is a by-pass capacitor for the power supply $V_{S6}$ while capacitor C16 provides output lag compensation. Resistor R23 is a feed back resistor. The output of this amplifier is RC coupled to a power amplifier comprising integrated circuit MC 1554 which is also available from Motorola Semiconductor Products Inc. and described in their data sheets DS 9069 dated February 1970. This is a straight forward power amplifier which feeds the ultrasonic frequency transducer 7.

Figure 16:
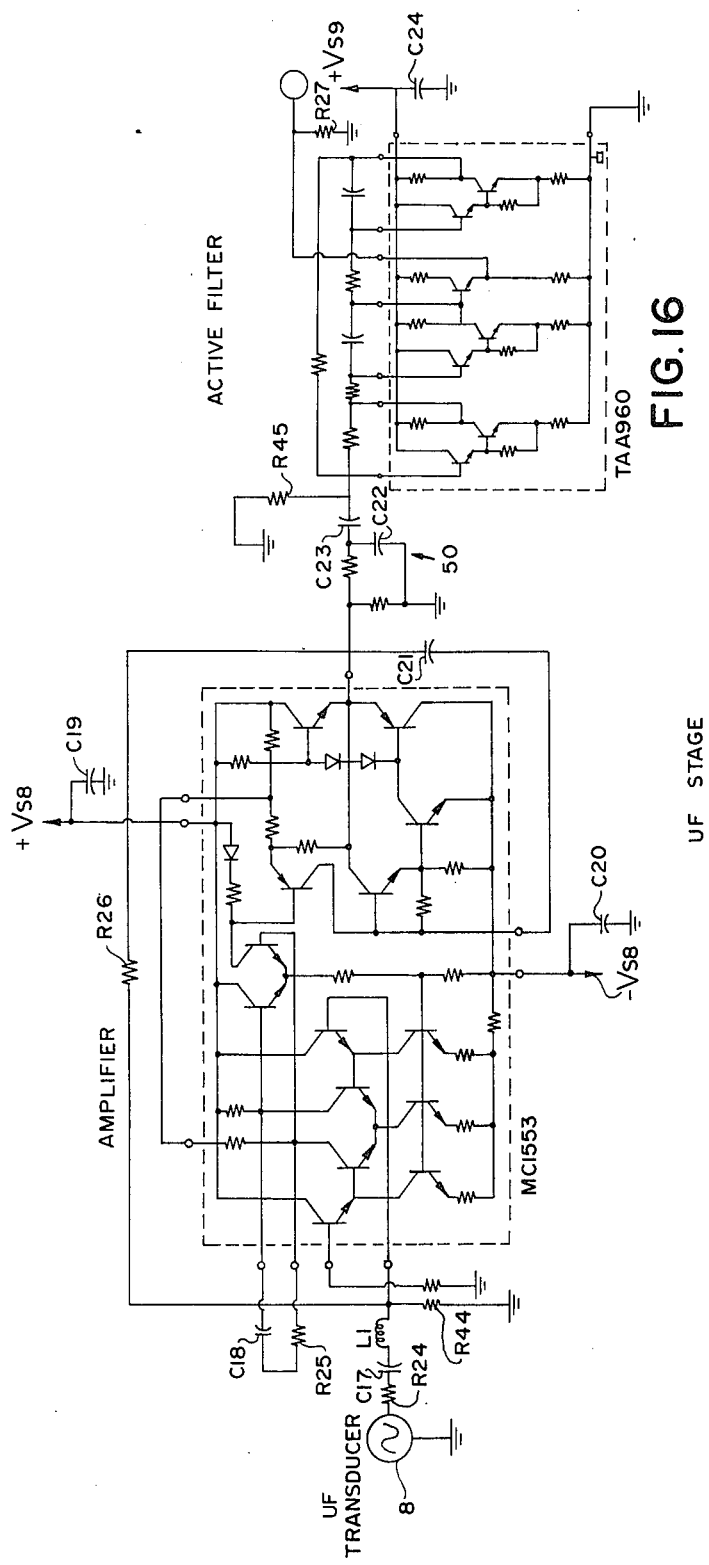

Turning now to the receiver circuitry, FIG. 16 shows an ultrasonic frequency transducer 8 connected through a resistor R24, capacitor C17 and a coil L1. These elements provide impedance matching of the transducer to the amplifier but may not be needed for some amplifiers.

Capacitor C18 and resistor R25 provide frequency compensation. Resistor R26 is a feedback resistor provided for stability purposes and to modify the input and output impedances. Capacitor C19 is a by-pass capacitor to remove ripple from the power supply $V_{S8}$. Similarly capacitor C20 is a bypass capacitor. Capacitor C21 provides output lag compensation. The network 50, which may not be needed in practice, is a coupling network which also provides some filter action, capacitor C22 acting as a low pass filter and capacitor C23 functioning as a high-pass filter element.

The active filter TAA 960 of FIG. 16 also shown in FIG. 12 and here functions to remove noise and frequencies above and below the signal range of interest. It may not be absolutely necessary. The active filter eliminates the need for tuned circuits and, being an integrated circuit, enables the device to be kept very small and light weight. Resistor R27 is a load matching resistor for the output F. Capacitor C24 is a by-pass capacitor for the power supply $V_{S9}$. The circuit acts as a band-pass filter.

Figure 17:
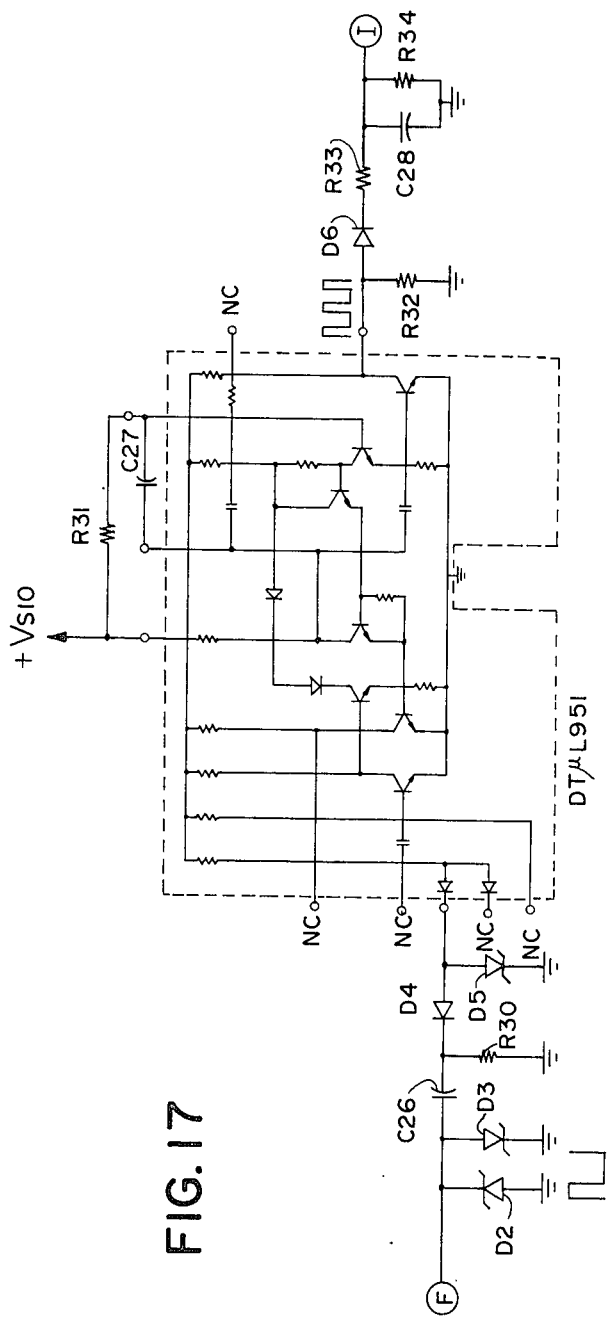

The output F of the active filter in FIG. 16 is fed to input F of the demodulator stage shown in FIG. 17 which also comprises an integrated circuit DT $\mu$ L 951, this being available from Fairchild Semiconductor. The input is limited by Zener diodes D2 and D3 after which it is differentiated by capacitor C26 to provide voltage spikes. A bleeder resistor R30 allows for discharging of capacitor C26.

Resistor R31 provides pulse width control while capacitor C27 is a timing capacitor.

The demodulator stage, FIG. 17, is a monostable multivibrator which is triggered by pulses from differentiator C26 at the input side. The diode D4 blocks positive going spikes so that the circuit is only triggered by negative going spikes. Zener diode D5 provides a further limiter function allowing for narrow band operation. That is, the demodulator will not trigger below a certain voltage which may be close to the Zener voltage, e.g. 0.1 volt lower.

Input 51 may be biased to provide a squelch function.

The demodulator stage produces output pulses dependent, in known manner, on the frequency of the input spikes. The output is then integrated to smooth it and a long integration time is used so that there is no audio input, the output is essentially DC.

Resistor R32 is a load matching resistor and diode D6 together with resistor R33 provide audio integration together with capacitor C28 and resistor R34.

Figure 18:
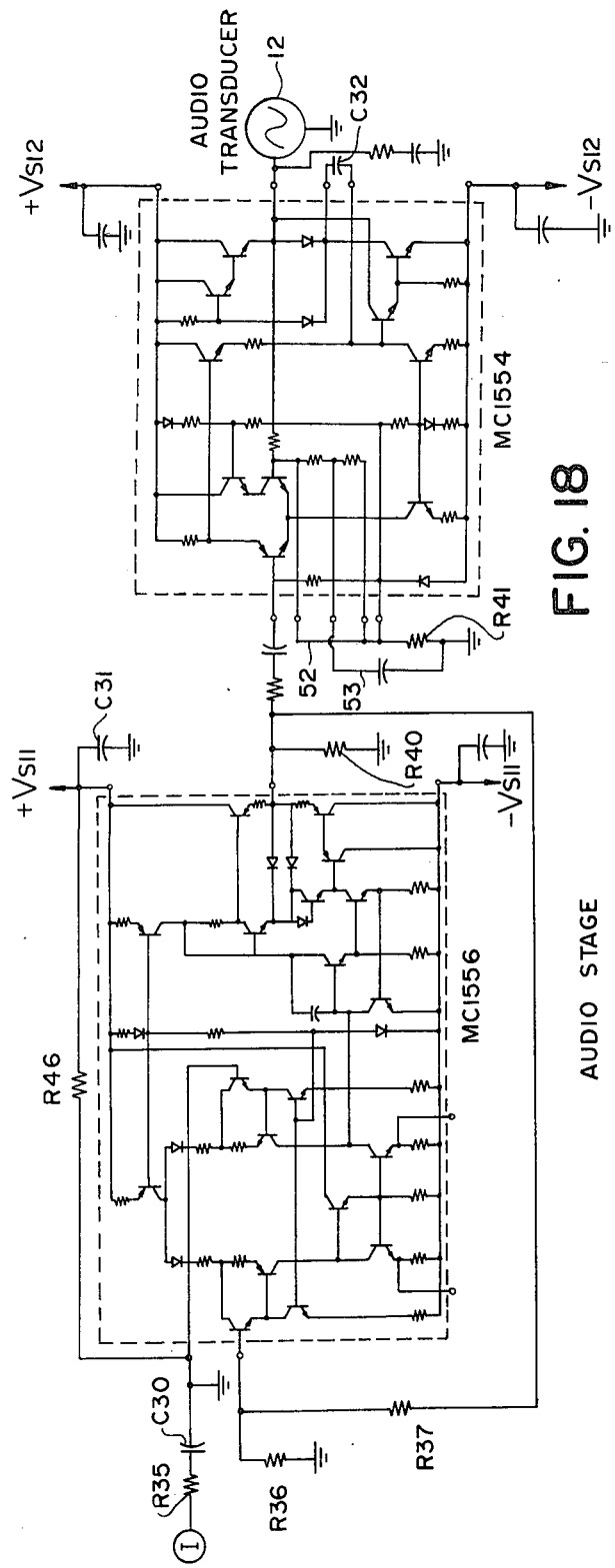

The output I of the demodulator stage, FIG. 17, feeds the input I of the audio amplification stage in FIG. 18, which stage corresponds to block 11 of FIG. 2.

The input I is fed through a coupling network comprising resistor R35 and capacitor C30. Resistors R36 and R37 comprise a voltage divider which provides feedback for the amplifier.

Capacitor C31 is a by-pass capacitor for the power supply $V_{S11}$.

Resistor R40 is a load matching resistor for the output of the amplifier MC 1556 which again is an integrated circuit referred to previously in connection with FIG. 12. The amplifier MC 1556 feeds a power amplifier MC 1554 previously discussed in connection with FIG. 14.

Capacitor C32 provides external frequency compensation while connections 52 and 53 provide voltage gain options. Resistor R41 is a bias reference.

The output of the power amplifier MC 1554 feeds an audio transducer 12 such as that discussed in connection with FIG. 2.

While the invention has been described as a frequency modulation system, a phase modulation could also be used. Indeed phase and frequency modulation signals cannot be physically differentiated at the output of a transmitter. The only difference in circuitry would be in the modulator, where standard phase modulation techniques could easily be applied in the same manner as the given frequency modulator.

What I claim as my invention is:

1. An ultrasonic transmitter and receiver unit having a transmit mode and a receive mode and switching means for changing from one mode to the other, said unit comprising an audio transducer for converting audio signals into audio frequency electrical signals or audio frequency electrical signals into audio signals, characterized in that in the transmit mode the audio transducer is connected to the input of an audio frequency band-pass amplifier, said audio band-pass amplifier having an output connected to an input of a first modulator which produces at its output angle modulated radio frequency signals of predetermined center frequency, said radio frequency signals being fed to one input of a balanced modulator having a second input to which is fed a fixed frequency radio frequency signal from a local oscillator, said center frequency and said fixed frequency differing in frequency by an amount such that said balanced modulator produces at its output ultrasonic frequency signals which are angle modulated in accordance with said audio signals, said ultrasonic frequency signals being fed via an ultrasonic frequency band-pass amplifier to an ultrasonic transducer, and characterized in that in the receive mode said ultrasonic transducer is connected via said ultrasonic frequency band-pass amplifier to a demodulator deriving audio frequency signals corresponding to audio modulations of ultrasonic signals received by the ultrasonic transducer, the audio frequency signals from the demodulator being fed via said audio band-pass amplifier to said audio transducer, said switching means normally maintaining said unit in the receive mode but changing it to the transmit mode in the presence of an output from said audio transducer if there is, at the same time, no output from the demodulator, said unit being mounted in a water-proof container, a resilient strap being attached to said container so that the unit may be strapped to a diver's head, wherein the audio transducer is a bone conduction type of transducer and is on one side of the resilient strap so as to lie in use against the forehead of a diver using it while the ultrasonic transducer is on another side of the strap so as to readily transmit ultrasonic vibrations to water surrounding the diver, and wherein said unit has an on-off switch mounted in the resilient strap so that when the strap is stretched upon being put around a diver's head, the on-off switch is moved to the "on" position from a normally "off" position.

2. An ultrasonic transmitter and receiver unit having a transmit mode and a receive mode and switching means for changing from one mode to the other, said unit comprising an audio transducer for converting audio signals into audio frequency electrical signals or audio frequency electrical signals into audio signals, characterized in that in the transmit mode the audio transducer is connected to the input of audio frequency band-pass amplifier, said audio band-pass amplifier having an output connected to an input of a first modulator which produces at its output angle modulated radio frequency signals of predetermined center frequency, said radio frequency signals being fed to one input of a balanced modulator having a second input to which is fed a fixed frequency radio frequency signal from a local oscillator, said center frequency and said fixed frequency differing in frequency by an amount such that said balanced modulator produces at its output ultrasonic frequency signals which are angle modulated in accordance with said audio signals, said ultrasonic frequency signals being fed via an ultrasonic frequency band-pass amplifier to an ultrasonic transducer, and characterized in that in the receive mode said ultrasonic transducer is connected via said ultrasonic frequency band-pass amplifier to a demodulator deriving audio frequency signals corresponding to audio modulations of ultrasonic signals received by the ultrasonic transducer, the audio frequency signals from the demodulator being fed via said audio band-pass amplifier to said audio transducer, said switching means normally maintaining said unit in the receive mode but changing it to the transmit mode in the presence of an output from said audio transducer if there is, at the same time, no output from the demodulator, said unit being mounted in a water-proof container, a resilient strap being attached to said container so that the unit may be strapped to a diver's head, wherein the audio transducer is a bone conduction type of transducer and is on one side of the resilient strap so as to lie in use against the forehead of a diver using it while the ultrasonic transducer is on another side of the strap so as to readily transmit ultrasonic vibrations to water surrounding the diver, said unit being battery powered and including means for charging the battery from an external power source which means comprises a coil embedded in the strap about a hole in said strap into which may be inserted a further coil, said further coil being wound about a magnetic core and being adapted to be connected to an AC source, said first-mentioned coil being connected through a battery charger circuit to the battery of the unit.

3. An ultrasonic transmitter and receiver unit having a transmit mode and a receive mode and switching means for changing from one mode to the other, said unit comprising an audio transducer for converting audio signals into audio frequency electrical signals or audio frequency electrical signals into audio signals, characterized in that in the transmit mode the audio transducer is connected to the input of an audio frequency band-pass amplifier, said audio band-pass amplifier having an output connected to an input of a first modulator which produces at its output angle modulated radio frequency signals of predetermined center frequency, said ratio frequency signals being fed to one input of a balanced modulator having a second input to which is fed a fixed frequency radio frequency signal from a local oscillator, said center frequency and said fixed frequency differing in frequency by an amount such that said balanced modulator produces at its output ultrasonic frequency signals which are angle modulated in accordance with said audio signals, said ultrasonic frequency signals being fed via an ultrasonic frequency band-pass amplifier to an ultrasonic transducer, and characterized in that in the receive mode said ultrasonic transducer is connected via said ultrasonic frequency band-pass amplifier to a demodulator deriving audio frequency signals corresponding to audio modulations of ultrasonic signals received by the ultrasonic transducer, the audio frequency signals from the demodulator being fed via said audio band-pass amplifier to said audio transducer, said switching means normally maintaining said unit in the receive mode but changing it to the transmit mode in the presence of an output from said audio transducer if there is, as the same time, no output from the demodulator, said unit being, mounted in a water-proof container, a resilient strap being attached to said container so that the unit may be strapped to a diver's head, wherein the audio transducer is a bone conduction type of transducer and is on one side of the resilient strap so as to lie in use against the forehead of a diver using it while the ultrasonic transducer is on another side of the strap so as to readily transmit ultrasonic vibrations to water surrounding the diver, wherein said unit has an on-off switch mounted in the resilient strap so that when the strap is stretched upon being put around a diver's head, the on-off switch is moved to the "on" position from a normally "off" position and wherein the outputs of said first modulator and said balanced modulator are frequency modulated signals.

* * * * *